(12) United States Patent
Robert et al.

(10) Patent No.: US 10,904,460 B2
(45) Date of Patent: Jan. 26, 2021

(54) IMAGING INSTRUMENT FOR CHECKING A TARGET DESIGNATION

(71) Applicant: SAFRAN ELECTRONICS & DEFENSE, Paris (FR)

(72) Inventors: Patrick Robert, Paris (FR); Hervé Sik, Paris (FR)

(73) Assignee: Safran Electronics & Defense, Paris (FR)

( * ) Notice: Subject to any disclaimer, the term of this patent is extended or adjusted under 35 U.S.C. 154(b) by 0 days.

(21) Appl. No.: 16/641,513

(22) PCT Filed: Jul. 11, 2018

(86) PCT No.: PCT/FR2018/051741
§ 371 (c)(1),
(2) Date: Feb. 24, 2020

(87) PCT Pub. No.: WO2019/038486
PCT Pub. Date: Feb. 28, 2019

(65) Prior Publication Data
US 2020/0236304 A1     Jul. 23, 2020

(30) Foreign Application Priority Data

Aug. 24, 2017   (FR) ..................................... 17 00873

(51) Int. Cl.
*G01J 5/02*       (2006.01)
*H04N 5/33*      (2006.01)
*G01C 21/00*    (2006.01)
*H04N 5/445*    (2011.01)
*H04N 7/18*      (2006.01)

(52) U.S. Cl.
CPC ............. *H04N 5/33* (2013.01); *G01C 21/005* (2013.01); *H04N 5/44504* (2013.01); *H04N 7/183* (2013.01)

(58) Field of Classification Search
CPC ...... H04N 5/33; H04N 5/44504; H04N 7/183; G01C 21/005; F41G 3/145; F41G 3/02; F41G 3/165; F41G 3/32
See application file for complete search history.

(56) References Cited

U.S. PATENT DOCUMENTS

| 4,669,809 A | 6/1987 | Patry et al. |
| 4,737,028 A | 4/1988 | Smith |
| 4,843,235 A | 6/1989 | Malone |

(Continued)

OTHER PUBLICATIONS

PCT International Report on Patentability for PCT/FR2018/051741, dated Jul. 16, 16, 2019, 6 pages.

(Continued)

*Primary Examiner* — Howard D Brown, Jr.
(74) *Attorney, Agent, or Firm* — Patterson Thuente Pedersen, P.A.

(57) ABSTRACT

An imaging instrument for controlling a target designation makes it possible to visualise a target designation spot (SP) within a scene (SC), while using only one image sensor. To do this, a filter is arranged on the image sensor, in a restricted area (ZC) of same. The filter makes it possible to increase a contrast and a signal-to-noise ratio for an image of the target designation spot, when a misalignment (DP) is produced in order to bring the image of the target designation spot into the area of the filter.

12 Claims, 2 Drawing Sheets

(56) References Cited

U.S. PATENT DOCUMENTS

2013/0112879 A1* 5/2013 Meyers ................ G02B 23/12
                                                       250/341.8
2020/0232762 A1* 7/2020 Hamilton ........... G02B 27/0101

OTHER PUBLICATIONS

English translation of PCT on Patentability for PCT/FR2018/051741, dated Jul. 16, 2019 International Report, 5 pages.
PCT International Search Report for PCT/FR2018/051741, dated Oct. 11, 2018, 3 pages.
English translation of PCT International Search Report for PCT/FR2018/051741, dated Oct. 11, 2018, 2 pages.

* cited by examiner

IMAGING INSTRUMENT FOR CHECKING A TARGET DESIGNATION

RELATED APPLICATIONS

The present application is a National Phase entry of PCT Application No. PCT/FR2018/051741, filed Jul. 11, 2018, which claims priority from FR Patent Application No. 17 00873, filed Aug. 24, 2017, said applications being hereby incorporated by reference herein in their entirety.

TECHNICAL FIELD OF THE INVENTION

The present invention relates to an imaging instrument for checking designation of a target.

BACKGROUND OF THE INVENTION

It is common to designate a remote target using a light beam, and especially by means of a laser beam, in order to allow a guided vehicule to be directed toward the target with a high precision. In fact, the beam spot that the beam produces on the target serves as reference for guiding the vehicule: a detection system that is located onboard the guided vehicule detects the beam spot, and a system for steering the vehicule keeps it on a path toward the beam spot, until the vehicule reaches the target. The precision of the impact of the guided vehicule on the target is therefore directly dependent on the precision with which the beam is oriented then maintained on the target. To this end, imaging instruments are used, which make it possible to check in real time whether the spot of the light beam is indeed located on the target. Such instruments make it possible to simultaneously view the scene, an outdoors landscape for example, in which the target, a vehicle for example, is located and the beam spot that is produced by the target designating beam on the target or in proximity thereto. When observation through the instrument reveals that the target designating beam spot is not on the desired target, the direction of the target designating beam spot may be corrected to more precisely place the beam spot on the target.

Most often, the scene is imaged by the instrument using infrared radiation, for example inside a wavelength range that extends between 3 µm (microns) and 15 µm, and the radiation of the target designating beam has a wavelength equal to 1.06 µm. The target designating radiation is then outside of the spectral range of the radiation that is used to capture the image of the scene. Using instruments that implement infrared radiation is necessary to obtain long-distance designations. Long distance-range efficiency will be spoken of in such a case.

Daytime or low-light-level applications are also contemplated with a designation beam that again has a wavelength equal to 1.06 µm, but with detectors that are sensitive both in the visible domain and in the near-infrared domain (commonly designated the NIR domain) or that are solely sensitive in the NIR domain. By definition, the NIR domain corresponds to the wavelength range that is comprised between 0.8 µm and 1.5 µm. The distance-ranges of systems that use these instruments are shorter than those of systems using infrared radiation with wavelength comprised between 3 µm and 15 µm, and medium distance-ranges will be spoken of in this case.

In existing instruments of a first type, the image of the scene and the spot of the target designating beam are captured using two image sensors, which are sensitive in two separate wavelength ranges. But there is then an uncertainty as to the accuracy with which the images, which are produced separately by the two sensors, are then superposed so that an operator can check accurately the location of the target designating spot inside the scene. For this reason, it is highly advantageous to use an instrument for checking target designation that implements a single sensor to capture the image of the scene and simultaneously locate the target designating spot in this scene image.

Such other instruments, each having a single image sensor for capturing both the scene and the target-designating spot, also exist. However, the photonic noise of the image of the scene as produced by this single sensor is important. Thus, because of this important photonic noise, the target designating spot becomes difficult to see, or almost invisible, within the image of the scene when the target is located far from the instrument. Typically, for long distance-range applications, the visibility of the target designating spot becomes insufficient when the target is further than 5 km (kilometers) from the instrument. However, there are circumstances which require to check the designation of a target with a high reliability even when the target is at least 10 or 15 km away from the imaging instrument used for this check. For so-called medium distance-range applications, the visibility of the spot may be insufficient for distances larger than 2 km, depending on atmospheric or operating conditions.

In particular, documents U.S. Pat. No. 4,737,028 and US 2013/0112879 describe such laser pointing and thermal imaging instruments that each use a single matrix array image sensor.

In light of this situation, an object of the invention is to improve the conditions and reliability of the checking of a target designation, when a check instrument is used that implements only a single image sensor. In particular, the object of the invention is, using such instrument, to provide an image of the target designating spot with a contrast and/or a signal-to-noise ratio that is (are) improved.

An auxiliary object is to combine such improvement with a simplicity, a rapidity and a comfort of use of the instrument that are maintained or improved.

SUMMARY OF THE INVENTION

To this end, the invention provides a new imaging instrument for checking designation of a target, which comprises:
an objective, designed to form an image of a scene with first radiation, called natural radiation, originating from elements of the scene, and designed so that the formed image contains a contribution originating from a target that is contained in the scene, this contribution being produced by second radiation, called pointer radiation, that is backscattered by the target; and
a matrix array image sensor, comprising pixel elements that are each simultaneously sensitive to the natural radiation and to the pointer radiation, the image sensor being placed to capture the image formed by the objective.

Put another way, the instrument of the invention is of the type comprising a single image sensor, such as described above. Specifically, the image that is captured by the sensor forms a representation of the scene, in which the natural radiation and the pointer radiation together contribute to making appear, within the imaged scene, the target that is irradiated with the pointer radiation.

According to the invention, the instrument furthermore comprises:

a filter that covers a limited region of the image sensor, called the confirmation region, and that is suitable for selectively transmitting, to the pixel elements that are contained in the confirmation region, the pointer radiation to the exclusion of the natural radiation or to the exclusion of a part of the natural radiation which is spectrally separated from the pointer radiation.

Thus, when the instrument is oriented toward the scene so that the target is imaged in the confirmation region of the image sensor, the target appears in the captured image only via the backscattered pointer radiation, or appears in the captured image mainly via this backscattered pointer radiation if the target is smaller than the confirmation region.

If the image of the spot of pointer radiation on the target is smaller than the confirmation region, then this image of the spot appears on a black or dark background in the confirmation region and hence has a high contrast and is thus very visible.

In addition, generally, in the confirmation region the filter removes the photonic noise of the natural radiation, and hence in this region only the photonic noise of the backscattered pointer radiation remains. However, the photonic noise of the backscattered pointer radiation is much lower, typically at least four times lower, than the photonic noise of the natural radiation in the image of the scene, and hence the target-designating spot appears much more clearly in the confirmation region.

Thus, when the target is identified in the image of the scene captured by the image sensor, by an operator in charge of checking the target designation, this operator can move the optical line of sight of the instrument by turning it, in order to bring the image of the target into the confirmation region. He can then view the spot of backscattered pointer radiation inside the confirmation region with a higher contrast and signal-to-noise ratio, and in this way check with greater certainty whether this spot is precisely located on the target or offset with respect thereto. Such a movement of the line of sight is called pointing-off by those skilled in the art, and is an operation that is particularly rapid and simple for the operator to perform, in order to check that the designating spot is precisely on the target.

Such an instrument according to the invention may in particular be designed so that the wavelength of the natural radiation that is detected by the pixel elements of the image sensor is comprised
- either between 3 µm and 15 µm, and in this case the wavelength of the pointer radiation, that is also detected by the pixel elements of the image sensor, is comprised between 1.00 µm and 1.10 µm, and may more specifically be equal to 1.064 µm;
- or between 0.36 µm and 1.5 µm, with in this other case the wavelength of the pointer radiation that is again comprised between 1.00 µm and 1.10 µm, and may more specifically be equal to 1.064 µm.

Preferably, the filter that covers the confirmation region of the image sensor may be an interference filter. Generally, this filter has a transmission spectral window that comprises the wavelength of the pointer radiation, but excludes the natural radiation or at least part thereof.

Preferably, the confirmation region in which the filter is found on the image sensor may be located in proximity to a peripheral edge of the matrix array of the pixel elements of the image sensor, or in a corner of this matrix array, or may be adjacent to this matrix-array corner or edge. In this way, a disturbance to the operator, which could result from the absence of image of the scene produced by the natural radiation inside this confirmation region, is decreased.

The image of the scene that is captured by the image sensor may correspond to an optical entrance field that has a first angular dimension comprised between 8 mrad (milliradian) and 80 mrad, and a second angular dimension comprised between 6 mrad and 60 mrad, this second dimension being measured perpendicular to the first dimension. In this case, the filter may have dimensions such that it corresponds, through the objective, to a part of the optical entrance field that has a third angular dimension comprised between 0.3 mrad and 3 mrad, when this third dimension is measured parallel to the first dimension of the optical entrance field, and that has a fourth dimension also comprised between 0.3 mrad and 3 mrad, when this fourth dimension is measured parallel to the second dimension of the optical entrance field.

According to a first improvement of the invention, which is referred to as automatic pointing-off and applicable to an instrument according to the invention, the instrument may furthermore comprise:
- a sighting system, designed to superpose a crosshair on the captured image, at a location within this captured image that is defined with respect to the image sensor; and
- an pointing-off device, designed to rotate the instrument by a set pointing-off angle, so that an element of the scene that is imaged in the crosshair before pointing-off is initiated, becomes imaged in the confirmation region when pointing-off is carried out.

Thus, it is sufficient for the operator to first direct the optical line of sight of the instrument so that the target initially appears in the crosshair, then to trigger the pointing-off device for the image of the target to be brought directly into the confirmation region. The operator is then able to see, in the captured image, whether the target-designating spot is located on the target or in proximity thereto within the imaged scene. Such procedure for checking target designation is even rapider, simpler and more comfortable for the operator since the amplitude and orientation of the pointing-off are preset.

A second improvement that is applicable when the instrument is able to implement automatic pointing-off, relates to a harmonization of the crosshair. To this end, the instrument may furthermore comprise a harmonizing system that is designed to adjust a position of the crosshair with respect to the image sensor, so that the target is imaged in a center of the confirmation region when the pointing-off is carried out if the same target was imaged in a center of the crosshair before the pointing-off was initiated.

Generally, an imaging instrument for checking designation of a target, and that is in accordance with the invention, may be an external-designation instrument, i.e. the beam of pointer radiation for designating the target is produced by a source that is independent of the imaging instrument.

Alternatively, the instrument is referred to as an internal-designation instrument, i.e. the source of pointer radiation forms part of the instrument, or is securely fastened thereto. The instrument then furthermore comprises:
- a target designating system, which comprises a laser unit designed to produce a beam of pointer radiation, and which is oriented to send this beam of pointer radiation to the target.

Then, when the instrument is simultaneously an internal-designation instrument and able to implement automatic pointing-off, it may advantageously be designed so that an orientation of the beam of pointer radiation with respect to the scene is identical between a first instant at which an element of the scene is imaged on the crosshair before pointing-off is initiated, and a second instant at which the same element of the scene is imaged in the confirmation region when pointing-off is carried out. Put another way, the designation of the target by the pointer beam is not adversely affected by the pointing action. According to one possible embodiment, the pointing-off device may be designed to conjointly rotate the objective, the image sensor and the laser unit. However, the instrument may then furthermore comprise a compensating system that is designed to keep the beam of pointer radiation parallel to the optical line of sight of the objective and of the image sensor as long as no pointing-off is initiated, and to become effective once pointing-off is carried out so as to compensate for an effect of the pointing-off on the beam of pointer radiation. To this end, the compensating system may comprise:

- a prismatic plate, which is transparent to the beam of pointer radiation and which has two planar faces that form therebetween a fixed dihedral angle; and
- a movable mechanism, which is designed to insert the prismatic plate into a path of the beam of pointer radiation when pointing-off is triggered, and to remove it when pointing-off is cancelled, or vice versa.

The dihedral angle is then selected so that the prismatic plate produces, when it is inserted into the path of the beam of pointer radiation, a deviation of this beam that is opposite or identical to the angle of the pointing-off. Other pointing-off devices are possible, such as devices for translating a lens orthogonally to its axis, or devices for angularly deviating a mirror with respect to optical components that are placed between the pointer system and the scene.

An additional aspect of the invention relates to a method for checking target designation, which comprises selectively designating the target in the scene using a beam of pointer radiation, and simultaneously viewing the scene with a target designation spot that is produced by a backscattered portion of the pointer radiation, using an imaging instrument according to the invention.

BRIEF DESCRIPTION OF THE DRAWINGS

Other particularities and advantages of the present invention will become apparent from the following description of non-limiting examples of embodiments thereof, which is given with reference to the appended drawings, in which.

DETAILED DESCRIPTION OF PREFERRED EMBODIMENTS

For the sake of clarity, the dimensions of the elements shown in the figures neither correspond to actual dimensions nor to ratios of actual dimensions. Furthermore, in the various figures, same references denote elements that are identical or that perform identical functions.

Figure 1:
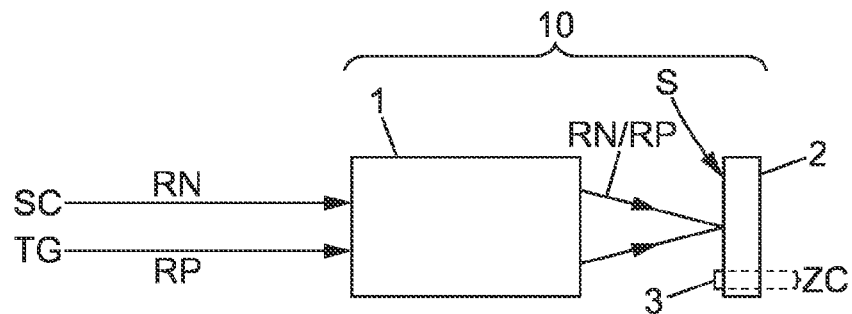
FIG. 1 is an optical diagram of an imaging instrument according to the invention.

With reference to FIG. 1, an imaging instrument 10 that is in accordance with the invention comprises an objective 1 and a matrix array image sensor 2. A photosensitive area S of the image sensor 2 is located in a focal plane of the objective 1, so that the objective 1 forms an image of a scene SC which is remote in front of the objective 1, on the image sensor 2. The instrument 10 is efficient for natural radiation, referenced RN, and pointer radiation, referenced RP. The natural radiation RN is emitted or scattered by elements of the scene SC which is comprised in an optical entrance field of the instrument 10. For example, the natural radiation RN may be in the spectral range of visible light, which is comprised between wavelength values of 0.360 µm (micrometers) and 0.800 µm, or even up to 1.5 µm. Alternatively, the natural radiation RN may be infrared radiation that is comprised between the wavelength values 3 µm and 15 µm. Such infrared natural radiation allows the scene SC to be viewed both during daytime and night.

The pointer radiation RP may be a laser radiation, for example at 1.06 µm. Such radiation is used to designate a target TG in the scene SC. The pointer radiation RP is then backscattered by portion of an element of the scene SC onto which it is directed. Part of the pointer radiation RP that is thus backscattered is collected by the objective 1, and forms the image of the scene element portion on the image sensor 2. The image that is captured by this sensor 2 comprises a first contribution, produced by the natural radiation RN, and a second contribution, produced by the pointer radiation RP and superposed on the first contribution. More precisely, the second contribution is a spot of pointer radiation, which appears in the image at the location in the scene SC where the beam of pointer radiation is backscattered. In the context of the present invention, the expressions "backscattered" and "reflected back" are used interchangeably when referring to the pointer radiation, although the use of one or the other depends on the diffuse or specular reflection features of the scene element lightened by the pointer beam. Moreover, when a desired target is lightened with the beam of pointer radiation, the spot of pointer radiation that is then obtained in the image captured by the sensor 2 is called the target-designating spot.

In a common manner, the matrix array image sensor 2 comprises a set of photosensitive elements, or pixel elements, that are located at the intersections of rows and columns inside the area S of the sensor.

Figure 2:
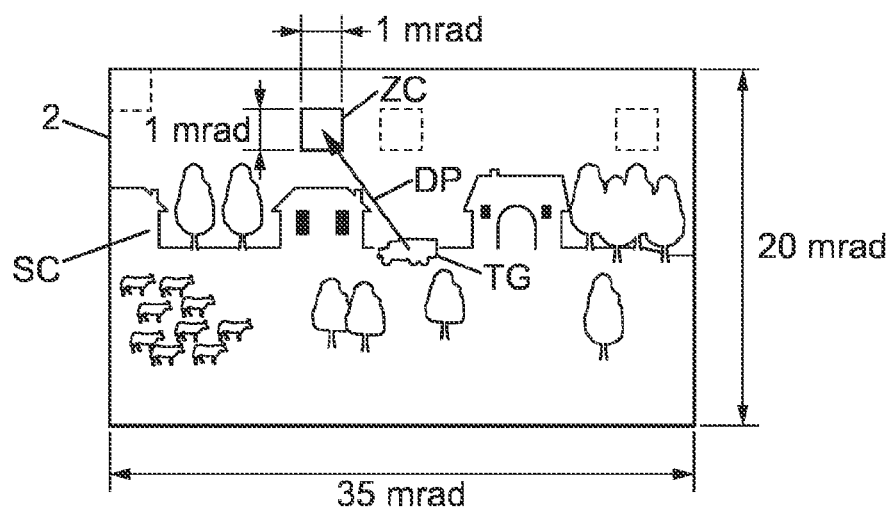
FIGS. 2 and 3 show a scene and target such as viewable using the imaging instrument of FIG. 1.

FIG. 2 shows an example of an image that can be captured with the instrument 10. The image shows the elements of the scene SC, including the target TG. The target TG is a vehicle in the shown example. The optical entrance field of the instrument 10 may have, by way of example, angular dimensions of 35 mrad (milliradians)×20 mrad.

Generally, beams of natural radiation RN or pointer radiation RP that are parallel to the optical boresight of the objective 1 and image sensor 2 converge toward a central point of the area S of this image sensor 2. For example, the vehicle that may form the target TG may be located at the center of the image when the optical boresight of the instrument 10 is directed onto this vehicle. From this position of the optical boresight, a pointing-off of the instrument 10 may allow the scene SC and the target TG to be shifted in the captured image so as to bring the target TG into a preset region of the area S of the image sensor 2, which region has been referenced ZC. Such pointing-off has been referenced DP in FIG. 2.

According to the invention, the region ZC of the area S of the image sensor 2 is equipped with a filter 3 (FIG. 1), which transmits the pointer radiation RP selectively with respect to the natural radiation RN when the pointer radiation RP and natural radiation RN are spectrally separate. Alternatively, the filter 3 may transmit the pointer radiation RP selectively with respect to a main part of the natural radiation RN, which part is rejected by the filter 3, when the spectral range of the pointer radiation RP is included in that of the natural radiation RN. The filter 3 may be produced in a way known to those skilled in the art, especially in the form of a multilayer stack when it is of interference type. So-produced filters can be found in many available books and articles dealing with the subject of optical filters.

The region ZC, which is called confirmation region for reasons that will be explained below, may have angular dimensions of 1 mrad×1 mrad when it is measured in the same way as the optical entrance field. It is entirely covered by the filter 3, so that the portion of the image that is captured by the sensor 2 in the region ZC is exclusively or essentially formed by the pointer radiation RP.

In case of internal designation, it is advantageous for the dimensions of the region ZC to cover all potential deharmonizations of the designating beam with respect to the instrument 10. Thus, the operator knows that the designating spot will be in the region ZC. In contrast, this region ZC is preferably not too large, in order not to mask the environment close to the target, nor the edges of the target if this latter is not of very small size.

Figure 3:
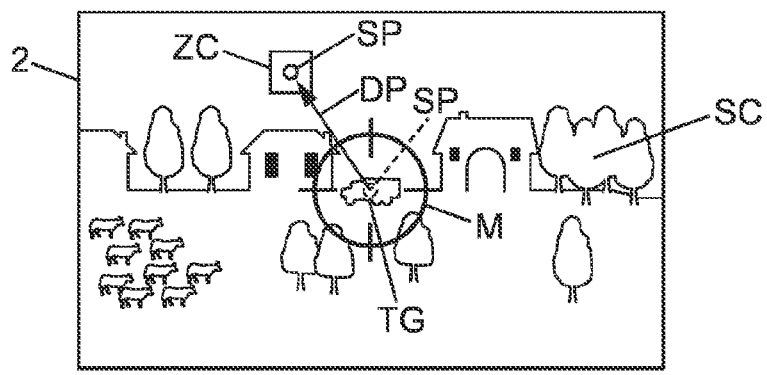

FIG. 3 corresponds to FIG. 2 when the target TG is irradiated by a beam of the pointer radiation RP. In practice, such beam of pointer radiation RP is of laser-beam type. The backscattering of the pointer radiation RP by the target TG produces a contribution in the image in the form of a beam spot SP that is locally superposed on the scene SC. However, because of the photonic noise of the image sensor 2, and of the distance of the target TG from the instrument 10, this spot SP may have a contrast and/or a signal-to-noise ratio that are/is low with respect to the image of the scene SC that is formed by the natural radiation RN. For this reason, in FIG. 3 it has been drawn with a dashed line on the vehicle that is the target TG.

However, when the pointing-off DP brings the image of the vehicle into the region ZC, the natural radiation RN no longer produces an image of the scene SC or of the target TG in this zone, whereas the image of the spot SP of the pointer radiation RP remains. This image of the spot SP thus has a contrast and a signal-to-noise ratio that are high in the region ZC. For this reason, the spot SP has now been drawn with a solid line in this region ZC (FIG. 3). The image that is viewed therefore consists, outside of the region ZC, of the scene SC, and, in the region ZC, of the spot SP of the pointer radiation RP that is backscattered from the vehicle. It is therefore possible for an operator who views this image to confirm that the target-designating spot SP is correctly located with respect to the rest of the scene SC, and therefore located on the desired target TG. For this reason, the region ZC is called confirmation region.

Advantageously, the confirmation region ZC may be located in the area S of the image sensor 2, in a location that makes it easy for the operator to understand, interpret or inspect the image content. For example, this location may be in proximity to an edge or corner of the area S, and preferably in a portion of this area S liable to be occupied by a representation of the sky in the case of an outdoors scene. In FIG. 2, the squares drawn with dashed lines indicate preferred positions that are thus possible for the confirmation region ZC in the area S.

FIG. 3 also shows a crosshair M that is superposed on the captured image, for example at the center of the area S of the image sensor 2. Such superposition is commonly achieved electronically, using the image data that are read from the sensor 2, with respect to the positions of the pixel elements in the area S. For example, the crosshair M may be at a central position inside the area S.

Such a crosshair M is particularly useful when the amplitude and orientation of the pointing-off DP are preset, or in other words when the pointing-off is said to be automatic by those skilled in the art. The operator then observes the scene SC that contains the target TG via the instrument 10, and orients the instrument so that the target TG appears in the crosshair M and if possible at the center thereof. He then actuates the automatic pointing-off, which automatically produces a translation of the image over the area S of the sensor 2, such that the element of the scene SC that was located at the center of the crosshair M, i.e. the target TG in the present case, becomes located in the confirmation region ZC. The image captured when the pointing-off is thus implemented allows the operator to check in real-time the existence and the location of the beam of pointer radiation RP with respect to the target TG.

The amplitude and orientation of the pointing-off DP therefore depend on the position of the confirmation region ZC in the area S of the image sensor 2. The pointing-off DP may especially be selected so that the variation in direction that it produces in the optical entrance field of the instrument 10 corresponds to a movement, in the focal plane, from the center of the crosshair M to the center of the confirmation region ZC.

Pointing-off devices that are designed to automatically apply an pointing-off of preset amplitude and orientation are known to those skilled in the art and hence it is not necessary to describe them anew here.

Figure 4A:
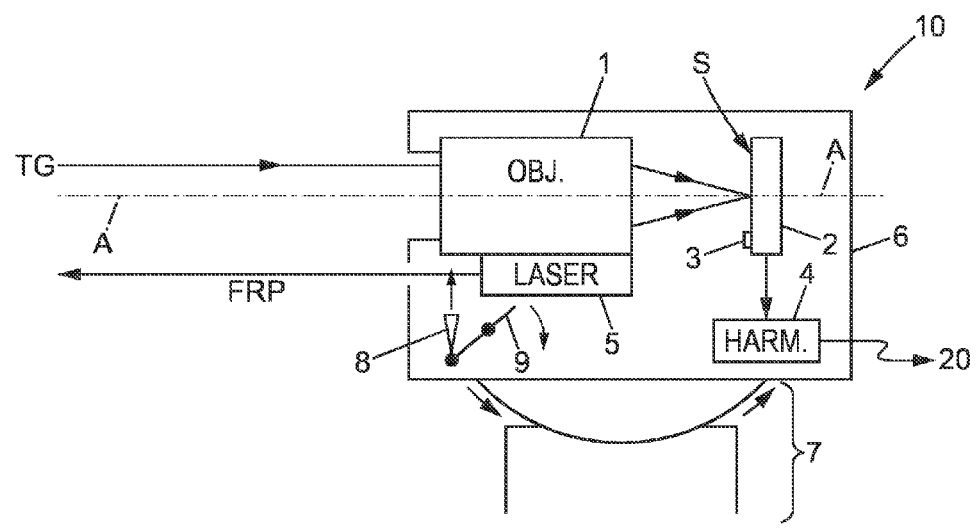
FIGS. 4a and 4b illustrate an internal-designation imaging instrument in a central pointing position (FIG. 4a) and in a pointing-off position (FIG. 4b).
Figure 4B:
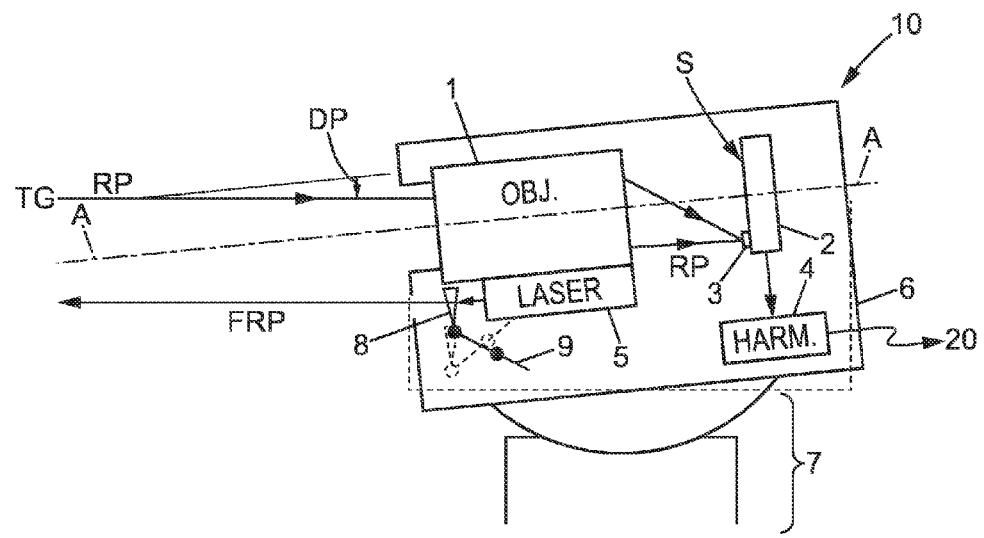

FIGS. 4a and 4b illustrate a particular type of instrument according to the invention, referred to as an internal designation instrument. An instrument of this type furthermore comprises a target designating system, which produces the beam of pointer radiation, referenced FRP. This target designating system incorporates inter alias a laser unit 5, which produces the beam FRP. In advantageous configurations of such internal designation instruments, the target designating system is fixed with respect to the objective 1 and image sensor 2, for example inside a common casing 6. All thereof may then be mounted on a holder 7 the orientation of which may be varied, and preferably on a holder with two axes of rotation. Such holder 7 may implement the aforementioned pointing-off DP, on triggering by the operator when it is automatic. However, it is then necessary for the orientation of the beam FRP with respect to the scene SC to be kept constant throughout the pointing-off, so that the beam spot SP of the beam FRP remains visible at the location of the target TG in the confirmation region ZC. To this end, the instrument 10 may furthermore comprise a compensating system that ensures that the pointing-off DP does not adversely affect the orientation of the beam FRP even though the target designating system is moved by the rotation of the holder 7 with the objective 1 and image sensor 2. In particular embodiments of such compensating system, the latter may comprise a prismatic plate 8 and a mechanism for moving the latter, which has reference number 9. For example, the moving mechanism 9, which is also called movable mechanism, may be a lever that moves the prismatic plate 8 between two preset positions. According to a first possibility, the prismatic plate 8 does not affect the beam FRP before pointing-off (FIG. 4a), and when the pointing-off DP is implemented by moving the casing 6 by way of the variable-orientation holder 7, the prismatic plate 8 is inserted into the path of the beam FRP (FIG. 4b). The prismatic plate is designed to exactly compensate for the effect of the movement of the casing 6, so that the beam spot SP of the beam FRP in the scene SC remains immobile between the triggering of pointing-off DP and after it has been implemented. To this end, the dihedral angle of the prismatic plate 8, and its orientation, are selected depending on the amplitude and angular orientation of the pointing-off DP. In this first embodiment of the compensating system, the dihedral angle of the prismatic plate 8 and its orientation are therefore selected to achieve a deviation of the beam FRP that is opposite to the angular variation of the casing 6 during the pointing-off DP.

According to a second possibility, the prismatic plate 8 may have an effect on the beam FRP before the pointing-off DP, but becomes effectless when the pointing-off DP is implemented. To this end, the dihedral angle of the prismatic plate 8 and its orientation must be selected to produce a deviation of the beam FRP that is identical to the angular variation of the casing 6 during the pointing-off DP.

Rather than adjusting the pointing-off DP based on the respective positions of the crosshair M and the confirmation region ZC as indicated above, it may be preferable to adjust the position of the crosshair M so that the pointing-off DP exactly moves the image by a vector that originates at the center of the crosshair M and that ends at the center of the confirmation region ZC. Such an adjustment is referred to as a harmonization by those skilled in the art. As commonly known, this may be achieved electronically or using software, when the crosshair M is superposed with the read signals from the image sensor 2 as indicated above. Such a harmonizing system has been labelled HARM, with reference number 4 in FIGS. 4*a* and 4*b*. The reference number 20 has been used to denote an output of image data of the imaging instrument 10, for connection to an image viewing system. According to one possible embodiment, to achieve such a harmonization, imaging conditions are selected such that the beam spot SP of the pointing radiation RP may be seen separately inside and outside the confirmation region ZC, in the captured image. The instrument 10 is then placed in pointing-off position, and a deviation is measured in the captured image, between the center of the beam spot SP and the center of the confirmation region ZC, in the direction of the latter center. The pointing-off DP is then removed, so that the beam spot SP returns towards the crosshair M in the newly captured image, but with a possible error with respect to the center thereof. The crosshair M is then moved with respect to the sensor 2, from the new position of the beam spot SP, by an oriented deviation which equals that measured beforehand in the pointing-off position.

Possibly, when pointing-off DP is carried out automatically, i.e. with amplitude and orientation of the pointing-off that are preset, the crosshair M may be translated in the captured image at the same time and in the same way as the scene SC and the beam spot SP.

Of course, the invention may be reproduced by adapting or modifying secondary aspects thereof with respect to the embodiments that have been described in detail above. In particular, for an imaging instrument that is according to the invention and that is an internal designation instrument, the target designating system may be securely fastened to a fixed portion of the pointing-off device, the system for compensating for pointing-off then not being necessary. Lastly, the invention may be applied to an imaging instrument for checking target designation that is an external designation instrument, i.e. the imaging instrument is separate and independent from the target designating system.

The invention claimed is:

1. An imaging instrument for checking designation of a target, comprising:
   an objective, designed to form an image of a scene with a first radiation, called natural radiation, originating from elements of the scene, and designed so that the formed image contains a contribution originating from a target that is contained in the scene, said contribution being produced by a second radiation, called pointer radiation, that is backscattered by the target; and
   a matrix array image sensor, comprising pixel elements that are each simultaneously sensitive to the natural radiation and to the pointer radiation, the image sensor being placed to capture the image formed by the objective;
so that the captured image forms a representation of the scene, in which the natural radiation and the pointer radiation together contribute to making appear, within the imaged scene, the target that is irradiated with the pointer radiation, the instrument furthermore comprising:
   a filter that covers a limited region of the image sensor, called a confirmation region, and that is suitable for selectively transmitting, to the pixel elements that are contained in the confirmation region, the pointer radiation to the exclusion of the natural radiation or to the exclusion of a part of said natural radiation which is spectrally separated from said pointer radiation,
whereby when the instrument is oriented toward the scene so that the target is imaged in the confirmation region of the image sensor, the target appears in the captured image only via the backscattered pointer radiation, or appears in said captured image mainly via said backscattered pointer radiation.

2. The instrument as claimed in claim 1, designed so that a wavelength of the natural radiation that is detected by the pixel elements of the image sensor is comprised between 3 μm and 15 μm, or between 0.36 μm and 1.5 μm, and so that a wavelength of the pointer radiation that is also detected by said pixel elements of the image sensor is comprised between 1.00 μm and 1.10 μm.

3. The instrument as claimed in claim 1, wherein the filter that covers the confirmation region of the image sensor is an interference filter.

4. The instrument as claimed in claim 1, wherein the confirmation region in which the filter is found on the image sensor is located in proximity to a peripheral edge or corner of a matrix array formed by the pixel elements of the image sensor.

5. The instrument as claimed in claim 1, designed so that the image of the scene that is captured by the image sensor corresponds to an optical entrance field having a first angular dimension comprised between 8 mrad and 80 mrad, and a second angular dimension comprised between 6 mrad and 60 mrad, when said second dimension is measured perpendicular to said first dimension,
and the filter has dimensions such that it corresponds, through the objective, to a part of the optical entrance field that has a third angular dimension comprised between 0.3 mrad and 3 mrad, when said third dimension is measured parallel to said first dimension of the optical entrance field, and a fourth dimension also comprised between 0.3 mrad and 3 mrad, when said fourth dimension is measured parallel to said second dimension of the optical entrance field.

6. The instrument as claimed in claim 1, furthermore comprising:
   a sighting system, designed to superpose a crosshair on the captured image, at a location within said captured image that is defined with respect to the image sensor; and
   a pointing-off device, designed to rotate the instrument by a set pointing-off angle, so that an element of the scene that is imaged on the crosshair before pointing-off is initiated, becomes imaged in the confirmation region when pointing-off is carried out.

7. The instrument as claimed in claim 6, furthermore comprising a harmonizing system designed to adjust a position of the crosshair with respect to the image sensor, so that the target is imaged in a center of the confirmation region when pointing-off is carried out, if said target was imaged in a center of the crosshair before pointing-off was initiated.

8. The instrument as claimed in claim 1, furthermore comprising:
   a target-designating system, comprising a laser unit designed to produce a beam of pointer radiation, and oriented to send the beam of pointer radiation to the target.

9. The instrument as claimed in claim 6, furthermore comprising:
   target-designating system, comprising a laser unit designed to produce a beam of pointer radiation, and oriented to send the beam of pointer radiation to the target,
the instrument being designed so that an orientation of the beam of pointer radiation with respect to the scene is identical between a first instant at which the element of the scene is imaged on the crosshair before pointing-off is initiated, and a second instant at which said element of the scene is imaged in the confirmation region when pointing-off is carried out.

10. The instrument as claimed in claim 9, wherein the pointing-off device is designed to conjointly rotate the objective, the image sensor and the laser unit, and the instrument furthermore comprises a compensating system that is designed to keep the beam of pointer radiation parallel to an optical line of sight of the objective and of the image sensor as long as no pointing-off is initiated, and to become effective once pointing-off is carried out so as to compensate for an effect of said pointing-off on said beam of pointer radiation.

11. The instrument as claimed in claim 10, wherein the compensating system comprises:
   a prismatic plate, which is transparent to the beam of pointer radiation and which has two planar faces that form therebetween a fixed dihedral angle; and
   a movable mechanism, which is designed to insert the prismatic plate into a path of the beam of pointer radiation when pointing-off is triggered, and to remove said prismatic plate from said path when pointing-off is cancelled, or to keep the prismatic plate on the path of the beam of pointer radiation when no pointing-off is triggered, and to remove said prismatic plate from said path when pointing-off is triggered,
the dihedral angle being selected so that the prismatic plate produces, when it is inserted into the path of the beam of pointer radiation, a deviation of said beam of pointer radiation that is opposite or identical to an angle of the pointing-off.

12. A method for checking target designation, comprising selectively designating a target in a scene using a beam of pointer radiation, and simultaneously viewing the scene with a target-designation spot that is produced by a backscattered portion of the pointer radiation,
wherein viewing is performed using an imaging instrument designed for checking designation of the target, said instrument comprising:
   an objective, designed to form an image of a scene with a first radiation, called natural radiation, originating from elements of the scene, and designated so that the formed image contains a contribution originating form a target that is contained in the scene, said contribution being produced by a second radiation, called pointer radiation, that is backscattered by the target; and
   a matrix array image sensor, comprising pixel elements that are each simultaneously sensitive to the natural radiation and to the pointer radiation, the image sensor being placed to capture the image formed by the objective;
the instrument being arranged so that the captured image forms a representation of the scene, in which the natural radiation and the pointer radiation together contribute to making appear, within the imaged scene, the target that is irradiated with the pointer radiation,
the instrument furthermore comprising:
   a filter that covers a limited region of the image sensor, called a confirmation region, and that is suitable for selectively transmitting, to the pixel elements that are contained in the confirmation region, the pointer radiation to the exclusion of the natural radiation or to the exclusion of a part of said natural radiation which is spectrally separated from said pointer radiation,
whereby when the instrument is oriented toward the scene so that the target is imaged in the confirmation region of the image sensor, the target appears in the captured image only via the backscattered pointer radiation, or appears in said captured image mainly via said backscattered pointer radiation.

* * * * *